United States Patent
Pattekar et al.

(10) Patent No.: US 11,659,012 B2
(45) Date of Patent: May 23, 2023

(54) RELAYED COMMUNICATION CHANNEL ESTABLISHMENT

(71) Applicant: Apple Inc., Cupertino, CA (US)

(72) Inventors: Amol V. Pattekar, San Jose, CA (US); Gokul P. Thirumalai, Mountain View, CA (US); Thomas P. Devanneaux, Los Altos, CA (US); Aleksei Naiden, San Jose, CA (US); Joe S. Abuan, Cupertino, CA (US); Yan Yang, San Jose, CA (US); Berkat S. Tung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1520 days.

(21) Appl. No.: 15/179,241

(22) Filed: Jun. 10, 2016

(65) Prior Publication Data
US 2016/0366195 A1    Dec. 15, 2016

Related U.S. Application Data (60) Provisional application No. 62/175,558, filed on Jun. 15, 2015.

(51) Int. Cl.
*G06F 15/16* (2006.01)
*H04L 65/1083* (2022.01)
(Continued)

(52) U.S. Cl.
CPC ...... *H04L 65/1086* (2013.01); *H04L 61/2589* (2013.01); *H04L 65/1069* (2013.01); *H04L 61/2514* (2013.01); *H04L 67/01* (2022.05)

(58) Field of Classification Search
CPC ............ H04L 65/1086; H04L 61/2589; H04L 65/1069; H04L 67/42; H04L 61/2514;
(Continued)

(56) References Cited

U.S. PATENT DOCUMENTS 8,145,614 B1 *   3/2012  Zimran ............... H04L 67/1097
                                                           702/182
8,601,157 B2   12/2013  Hozumi
(Continued)

FOREIGN PATENT DOCUMENTS

EP    2938041 A1 * 10/2015  ......... H04L 65/1063
GB    2538935 A  * 12/2016  ............. G06F 21/16

OTHER PUBLICATIONS

Jointly Optimal Rate Control and Relay Selection for Cooperative Wireless Video Streaming Zhangyu Guan;Tommaso Melodia;Dongfeng Yuan IEEE/ACM Transactions on Networking (Year: 2013).*

(Continued)

*Primary Examiner* — Oscar A Louie
*Assistant Examiner* — Oluwatosin M Gidado
(74) *Attorney, Agent, or Firm* — Kowert, Hood, Munyon, Rankin & Goetzel, P.C.

(57) ABSTRACT

Establishing a communication channel via a relay server with reduced setup time. Upon request by an initiating communication device a relay allocation server may allocate a single relay server for use in a communication session between the initiating communication device and one or more recipient communication devices. The relay server may be selected to perform favorably for the initiating communication device. Messaging for establishment of the communication session may be performed using persistent messaging connections, to avoid connection establishment cost. Messaging may also be performed using address tokens to avoid the cost of discovering global IP addresses. Following establishment of the communication session, the relay server may discover the IP address of one or more recipient communication devices, and may initiate reallocation of those devices to another relay server.

19 Claims, 5 Drawing Sheets

(51) Int. Cl.
*H04L 65/1069* (2022.01)
*H04L 61/2589* (2022.01)
*H04L 61/2514* (2022.01)
*H04L 67/01* (2022.01)

(58) Field of Classification Search
CPC ............. H04L 67/1002; H04L 49/9094; H04L 12/4641; H04L 29/12471
USPC ........................................................ 709/205
See application file for complete search history.

(56) References Cited

U.S. PATENT DOCUMENTS

| | | | | |
|---|---|---|---|---|
| 9,118,813 | B2* | 8/2015 | Park | H04L 65/1069 |
| 9,120,020 | B2* | 9/2015 | Michel | A63F 13/12 |
| 9,161,289 | B2 | 10/2015 | Papadogiannis et al. | |
| 10,129,412 | B1* | 11/2018 | Singh | H04L 29/06 |
| 2005/0281244 | A1* | 12/2005 | Toskala | H04W 76/15 370/349 |
| 2008/0077665 | A1* | 3/2008 | Sekaran | H04L 12/1827 709/204 |
| 2009/0262668 | A1* | 10/2009 | Hemar | G06Q 30/02 370/260 |
| 2010/0027418 | A1* | 2/2010 | Rodrig | H04L 41/147 370/235 |
| 2010/0138531 | A1* | 6/2010 | Kashyap | H04L 65/608 709/227 |
| 2010/0180111 | A1* | 7/2010 | Hahn | H04W 12/06 713/150 |
| 2010/0189241 | A1* | 7/2010 | Miller | H04M 3/56 379/202.01 |
| 2010/0306410 | A1* | 12/2010 | Jansen | H04L 29/12066 709/245 |
| 2011/0179179 | A1* | 7/2011 | Lin | H04W 76/14 709/226 |
| 2012/0221714 | A1* | 8/2012 | Amano | H04L 43/0882 709/224 |
| 2012/0265810 | A1* | 10/2012 | Reid | H04L 65/4076 709/204 |
| 2013/0282802 | A1* | 10/2013 | Tanimoto | H04L 12/4641 709/203 |
| 2013/0294331 | A1 | 11/2013 | Wang et al. | |
| 2014/0324960 | A1* | 10/2014 | Pattan | H04N 21/242 709/203 |
| 2015/0012840 | A1* | 1/2015 | Maldari | H04N 21/4728 715/748 |
| 2015/0067033 | A1 | 3/2015 | Martinsen et al. | |
| 2015/0142921 | A1* | 5/2015 | Yamada | H04L 67/32 709/219 |
| 2015/0156069 | A1* | 6/2015 | Wu | H04L 67/02 709/221 |
| 2015/0180982 | A1 | 6/2015 | Yoshida | |
| 2016/0014668 | A1* | 1/2016 | Chou | H04W 76/14 455/7 |
| 2016/0054988 | A1* | 2/2016 | Desire | G05B 19/04 717/177 |
| 2016/0191461 | A1* | 6/2016 | Wang | H04L 61/2589 709/227 |
| 2016/0285720 | A1* | 9/2016 | Mäenpää | H04L 65/605 |
| 2016/0353498 | A1* | 12/2016 | Enomoto | H04W 60/04 |
| 2017/0063508 | A1* | 3/2017 | Stalley | H04L 43/0864 |
| 2017/0188114 | A1* | 6/2017 | Bibayoff | H04N 21/6547 |
| 2017/0214529 | A1* | 7/2017 | Barbosa E Oliveira | H04L 9/3226 |
| 2017/0295226 | A1* | 10/2017 | Basta | H04L 67/1042 |
| 2018/0048865 | A1* | 2/2018 | Taylor | G06F 3/0488 |

OTHER PUBLICATIONS

An adaptive resource allocation scheme for device-to-device communication underlaying cellular networks Foad Hajiaghajani;Mehdi Rasti 2015 IEEE/CIC International Conference on Communications in China (ICCC) Year: 2015 | Conference Paper | Publisher: IEEE (Year: 2015).*

An adaptive resource allocation scheme for device-to-device communication underlaying cellular networks Foad Hajiaghajani;Mehdi Rasti 2015 IEEE/CIC International Conference on Communications in China (ICCC) Year: 2015 | Conference Paper | Publisher: IEEE (Year: 2015) (Year: 2015).*

* cited by examiner

RELAYED COMMUNICATION CHANNEL ESTABLISHMENT

PRIORITY CLAIM

This application claims priority to U.S. provisional patent application Ser. No. 62/175,558, entitled "Establishment of Relayed Communication Channel," by Amol V. Pattekar, et al., filed Jun. 15, 2015, which is hereby incorporated by reference in its entirety as though fully and completely set forth herein.

TECHNICAL FIELD

The present application relates to communications establishment, and more particularly to quickly establishing relayed communication channels between electronic communications devices.

DESCRIPTION OF THE RELATED ART

Audio and video communications between users via personal and/or mobile computing devices are rapidly growing in usage. For example, IP-based telecommunications and videoconferencing services (e.g., such as FaceTime™ from Apple Inc.) are becoming increasingly common using both wired and wireless media.

The Internet Protocol (IP) provides for a finite number of addresses. In order to expand the number of nodes that may be identified with that set of addresses, many networks employ a Network Address Translator (NAT), e.g., as defined by the Internet Engineering Task Force (IETF) RFC 5766. Use of a NAT enables hiding an entire IP address space, usually including private network IP addresses, behind a single IP address in a public address space.

However, if a communication device is located behind a NAT, then in certain situations it can be impossible for that communication device to communicate directly with other nodes (peers). In these situations, it may be necessary to use the services of an intermediate node that acts as a communication relay. For example, a relay node may typically be utilized through application of protocols such as Interactive Connectivity Establishment (ICE), as defined by IETF RFC 5245; Session Traversal Utilities for NAT (STUN), as defined by IETF RFC 5389; and Traversal Using Relay NAT (TURN), as defined by IETF RFC 3489.

Application of these protocols may introduce noticeable delay in establishment of a communication channel. Traditionally, establishment of a communication channel between two participating communication devices requires an initiating communication device to determine both its own global IP address, as well as the global IP address of the remote communication device with which it intends to communicate.

Additionally, establishing the communication channel according to these protocols then requires selection of respective relay nodes for use by each participant. Because the relay nodes cannot typically be changed once the communication channel has been established, these protocols provide for each relay node to be selected so as to be optimized for use by the respective participant, so as to promote overall efficiency of the communication session. Determining optimal relay nodes for each participant may introduce further delay.

Additionally, according to these protocols, once the relay nodes have been selected, all participants bind to their respective relay nodes before communication on the channel may begin. Additional steps such as negotiation of invitation messages and other handshaking may also be required. These stages may all introduce further delay.

Therefore, improvements are desired in relayed communication channel establishment.

SUMMARY

Some embodiments described herein relate to a method for establishing a communication session between an initiating communication device and a recipient communication device using a relay allocation server. The relay allocation server may receive, from the initiating communication device, over a first connection, a request for allocation of a relay server for the communication session. The relay allocation server may further allocate a first relay server for the communication session. The relay allocation server may further provide, to the initiating communication device, over the first connection, information identifying the first relay server allocated for the communication session; and may provide, to the recipient communication device, over a second connection, information identifying the first relay server allocated for the communication session.

In some scenarios, allocating the first relay server for the communication session may include the relay allocation server selecting the first relay server for use by both the initiating communication device and the recipient communication device to establish the communication session between the initiating communication device and the recipient communication device, wherein the first relay server may be selected based on a network location of the initiating communication device and without regard to a network location of the recipient communication device.

In some scenarios, the relay allocation server may further receive, from the recipient communication device, after providing to the recipient communication device the information identifying the first relay server, a request for allocation of a second relay server for use by the recipient communication device for the communication session. The relay allocation server may allocate the second relay server for use by the recipient communication device for the communication session, the allocating based on a network location of the recipient communication device; and may provide, to the recipient communication device, information identifying the second relay server.

In some scenarios, the first connection and the second connection may be persistent connections. Providing, to the recipient communication device, the information identifying the first relay server may be performed without determining an IP address of the recipient communication device.

In some scenarios, the relay allocation server may establish a persistent connection between the relay allocation server and a messaging server. The first connection may include a first connection leg including the persistent connection between the relay allocation server and the messaging server, and a second connection leg including a persistent connection between the messaging server and the initiating communication device. The second connection may include the first connection leg including the persistent connection between the relay allocation server and the messaging server, and a third connection leg including a persistent connection between the messaging server and the recipient communication device.

In some scenarios, the recipient communication device is a first recipient communication device, wherein the communication session is further between the initiating communication device, the first recipient communication device, and a second recipient communication device. The relay allocation server may further provide, to the second recipient communication device, over a third connection, information identifying the first relay server allocated for the communication session.

Some embodiments described herein relate to a recipient communication device including: at least one processor; and a memory storing software instructions executable by the at least one processor. The software instructions, when executed, may cause the recipient communication device to receive, from a relay allocation server, information identifying a first relay server allocated for use by both the recipient communication device and an initiating communication device for a communication session initiated by the initiating communication device; join the communication session using the first relay server; receive, from the first relay server, after joining the communication session, an instruction to request a different relay server; transmit, to the relay allocation server, a request for allocation of a second relay server for use by the recipient communication device for the communication session; receive, from the allocation server, information identifying the second relay server allocated for use by the recipient communication device for the communication session; and join the communication session using the second relay server.

In some scenarios, the first relay server may be selected without regard to a network location of the recipient communication device, and the second relay server may be selected based on the network location of the recipient communication device.

In some scenarios, the software instructions may further cause the recipient communication device to establish a first persistent connection to a messaging server, wherein the messaging server maintains a second persistent connection with the relay allocation server, wherein receiving the information identifying the first server, transmitting the request for allocation of the second relay server, and receiving information identifying the second relay server are performed via the first persistent connection and the second persistent connection without additional connection establishment.

In some scenarios, in joining the communication session, the software instructions may cause the recipient communication device to: transmit, to the first relay server, a request to bind the recipient communication device to the communication session; and receive, from the first relay server, an acknowledgment that both the recipient communication device and the initiating communication device are bound to the communication session. Further, in joining the communication session, the software instructions further may cause the communication device to transmit communication data to the first relay server after transmitting the request to bind the recipient communication device, but before receiving the acknowledgment.

Some embodiments described herein relate to a method for establishing a communication session, using a relay server, between a plurality of communication devices. The relay server may receive, from each communication device of the plurality of communication devices, a respective bind request. The relay server may further bind the communication session to each communication device of the plurality of communication devices, in response to the respective bind request. The relay server may further transmit, to each communication device of the plurality of communication devices, an acknowledgment that all of the communication devices of the plurality of communication devices are bound to the communication session. The relay server may further receive communication data from a first communication device of the plurality of communication devices, wherein the receiving the communication data begins prior to the transmitting the acknowledgment.

In some scenarios, the relay server may further transmit to each respective communication device bound to the communication session by the relay server, other than the first communication device, at least a portion of the received communication data. For example, upon binding a particular communication device to the communication session, the relay server may begin transmitting to the particular communication device subsequently received portions of the communication data. As another example, the relay server may store the received communication data, wherein, following the binding a particular communication device to the communication session, the relay server may transmit to the particular communication device stored portions of the communication data received prior to binding of the particular communication device.

In some scenarios, the relay server may determine that a different relay server would provide improved relay performance for a particular communication device of the plurality of communication devices; and may transmit, to the particular communication device, an instruction to request that a relay allocation server allocate a different relay server for use by the particular communication device for the communication session. For example, determining that a different relay server would provide improved relay performance for a particular communication device of the plurality of communication devices may be based on a network location of the particular communication device. As another example, determining that a different relay server would provide improved relay performance for a particular communication device of the plurality of communication devices may be based on a traffic load of the relay server. As yet another example, the relay server may receive notification that the communication session has been bound to the particular communication device by a second relay server; and may transmit, to the second relay server, subsequent communication data for the particular communication device.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present disclosure.

ICE: Interactive Connectivity Establishment
LTE: Long Term Evolution
NAT: Network Address Translation
RAT: Radio Access Technology
RX: Receive
STUN: Session Traversal Utilities for NAT
TURN: Traversal Using Relay NAT
TX: Transmit
WLAN: Wireless Local Area Network Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using cellular communication and/or WLAN communication. Examples of mobile devices include mobile telephones or smart phones (e.g., iPhone™, Android™-based phones), and tablet computers such as iPad, Samsung Galaxy, etc. Various other types of devices would fall into this category if they include both cellular and Wi-Fi communication capabilities, such as laptop computers (e.g., MacBook), portable gaming devices (e.g., Nintendo DS™, PlayStation Portable™, Gameboy Advance™, iPhone™), portable Internet devices, and other handheld devices, as well as wearable devices such as wrist-watches, headphones, pendants, earpieces, etc. In general, the term "mobile device" can be broadly defined to encompass any electronic, computing, and/or telecommunications device (or combination of devices) which is easily transported by a user and capable of wireless communication using WLAN and/or cellular communication.

Communication Device—any of various types of computer systems that perform wireless or wired personal communications, such as real time audio or video communications. Examples of communication devices include mobile devices as defined above, as well as stationary personal computing devices such as desktop computers that are capable of performing personal communications.

Cellular—The term "cellular" has the full breadth of its ordinary meaning, and at least includes a wireless communication network or RAT distributed over land areas called "cells" and is used by virtually all mobile telephones today.

Cellular RAT—The term "cellular RAT" has the full breadth of its ordinary meaning, and at least includes any of the present or future radio access technologies used to communication on a cellular network, such as Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced, and other similar or future cellular RATs, including 3G, 4G, 5G, 6G, etc., cellular RATs.

Cellular Base Station—The term "Cellular Base Station" has the full breadth of its ordinary meaning, and at least includes a wireless cellular communication station installed at a fixed location and used to communicate as part of a cellular network or cellular radio access technology (RAT).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1A:
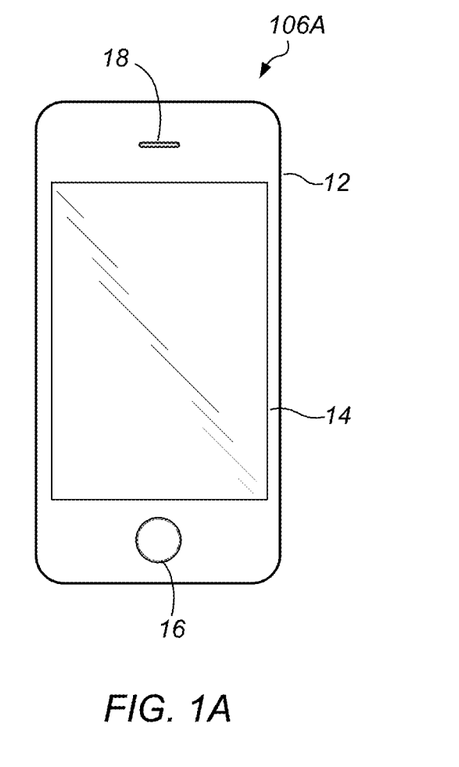
FIGS. 1A and 1B illustrate example communication devices, according to some embodiments.
Figure 1B:
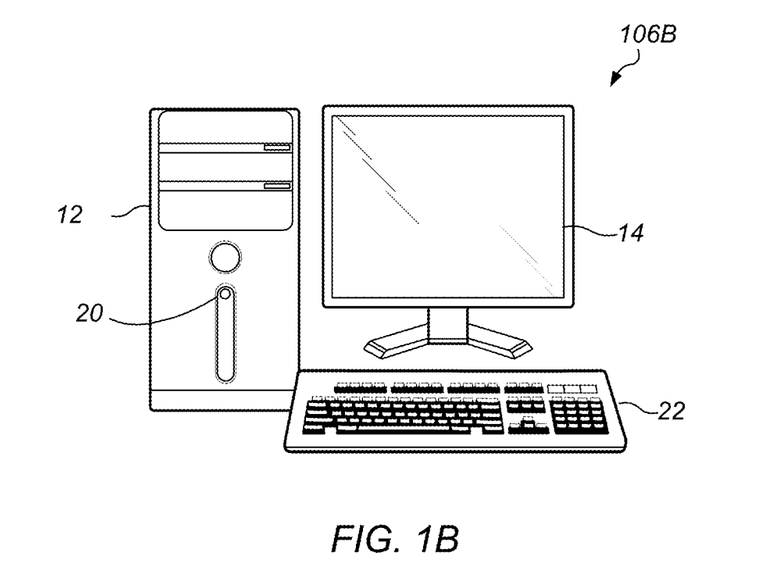

FIGS. 1A and 1B—Communication Device

FIG. 1A illustrates an example communication device 106A, in this case a telephone device, such as a smart phone. The term communication device 106 may be any of various devices as defined above. FIG. 1B illustrates another example of communication device 106B, in this case a desktop computer.

Communication device 106 may include a housing 12 which may be constructed from any of various materials. Communication device 106 may have a display 14, which may, in some cases, be a touch screen that incorporates capacitive touch electrodes. Display 14 may be based on any of various display technologies. The communication device 160 may also include various additional input devices such as keyboard 22, as well as other input devices (not shown), such as a mouse, trackpad, remote controller, joystick, etc. The housing 12 of the communication device 106 may contain or include openings for any of various elements, such as home button 16, speaker port 18, power button 20, and other elements (not shown), such as microphone, data port, removable media port, and possibly various other types of buttons, e.g., volume buttons, ringer button, etc.

The communication device 106 may support one or more communication technologies. For example, communication device 106 may be configured to communicate using any of various cellular radio access technologies (RATs). The communication device 106 may also, or alternatively, be configured to support at least one Wireless LAN (WLAN), such as at least one Wi-Fi RAT. Various different or other RATs may be supported as desired. The communication device 106 may also, or alternatively, be configured to support at least one wired communication technology, such as Ethernet.

The communication device 106 may be configured to establish a relayed communication session with one or more other communication devices. For example, the communication device 106 may be configured to perform one or more of the methods for establishing a relayed communication session as disclosed herein.

Figure 2:
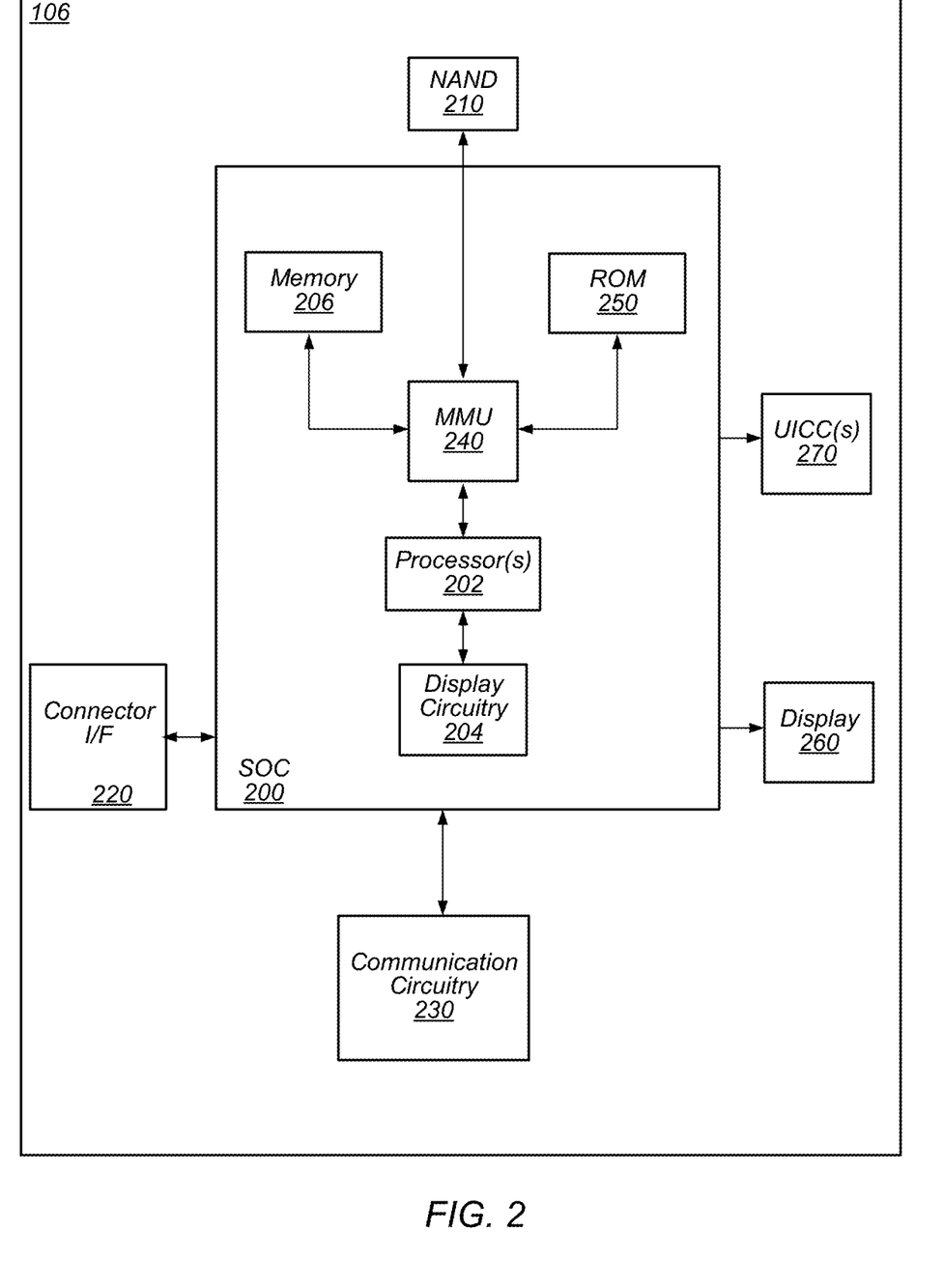
FIG. 2 is an example block diagram of a communication device, according to some embodiments.

FIG. 2—Communication Device Block Diagram

FIG. 2 illustrates an example simplified block diagram of a communication device 106. As shown, the communication device 106 may include a set of components 200 configured to perform core functions. For example, this set of components may be implemented as a system on chip (SOC), which may include portions for various purposes. Alternatively, this set of components 200 may be implemented as separate components for the various purposes. The set of components 200 may be coupled to various other circuits of the communication device 106. For example, the communication device 106 may include various types of memory (e.g., including NAND flash 210), an input/output interface 220 (e.g., for coupling to a computer system; dock; charging station; input devices, such as a microphone, camera, keyboard; output devices, such as speakers; etc.), the display 260, which may be integrated with or external to the communication device 106, and communication circuitry 230. The communication circuitry 230 may include, for example, cellular communication circuitry such as for LTE, GSM, etc.; short range wireless communication circuitry (e.g., Bluetooth™ and WLAN circuitry); and/or wired communication circuitry, such as a network interface card, e.g., for Ethernet. Wireless communication circuitry such as for cellular or short range wireless communications may include radios, baseband processors, one or more antennas, etc. The communication device 106 may further include one or more smart cards 270 that include SIM (Subscriber Identity Module) functionality, such as one or more UICC(s) (Universal Integrated Circuit Card(s)) cards 270.

As shown, the SOC 200 may include processor(s) 202 which may execute program instructions for the communication device 106 and display circuitry 204 which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, communication circuitry 230, connector I/F 220, and/or display 260. The MMU 240 may be configured to perform memory protection and page table translation or set up. In some embodiments, the MMU 240 may be included as a portion of the processor(s) 202.

As noted above, the communication device 106 may be configured to communicate using wireless and/or wired communication circuitry. The communication device 106 may be configured to communicate over a relayed communication channel with one or more remote communication devices via a relay server. The communication device 106 may be further configured to communicate with a relay allocation server to facilitate establishment of the relayed communication channel, as disclosed herein.

As described herein, the communication device 106 may include hardware and software components for implementing the above features for establishing and utilizing relayed communication channels, as well as the various other techniques described herein. The processor 202 of the communication device 106 may be configured to implement part or all of the features described herein, e.g., by executing program instructions stored on a memory medium (e.g., a non-transitory computer-readable memory medium). Alternatively (or in addition), processor 202 may be configured as a programmable hardware element, such as an FPGA (Field Programmable Gate Array), or as an ASIC (Application Specific Integrated Circuit). Alternatively (or in addition)

the processor 202 of the communication device 106, in conjunction with one or more of the other components 200, 204, 206, 210, 220, 230, 240, 250, 260, 270 may be configured to implement part or all of the features described herein.

Figure 3:
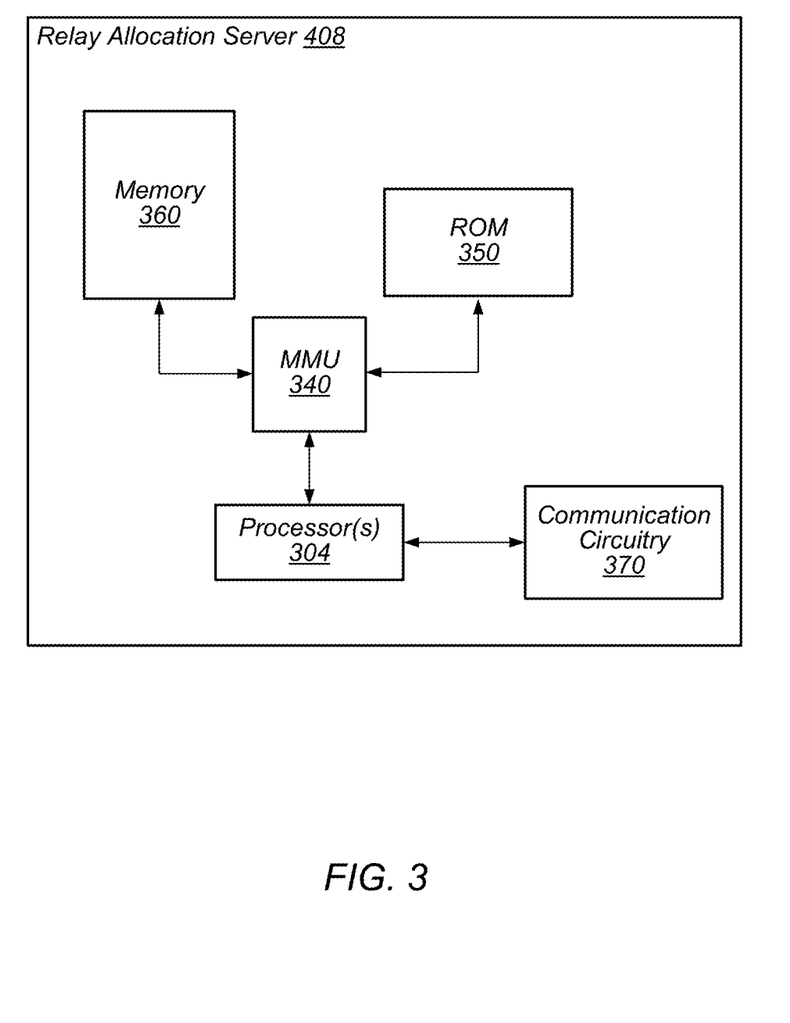
FIG. 3 is an example block diagram of a relay allocation server, according to some embodiments.

FIG. 3—Relay Allocation Server Block Diagram

FIG. 3 illustrates an exemplary block diagram of a relay allocation server 408. It is noted that the block diagram of the relay allocation server of FIG. 3 is one example of a possible system, and other arrangements may be implemented within the scope of the present disclosure. As shown, the relay allocation server 408 may include processor(s) 304 which may execute program instructions for the relay allocation server 408. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The relay allocation server 408 may include communication circuitry 370. The communication circuitry 370 may include at least one network port providing access to a communication network. For example, the communication circuitry 370 may be configured to communicate over a persistent connection, such as to a push notification server or other message server. As another example, the communication circuitry 370 may be configured to communicate over a traditional IP connection.

As described herein, the relay allocation server 408 may include hardware and software components for implementing the above features for establishing a relayed communication session, e.g., by allocating one or more relay servers for a relayed communication session, as well as the various other techniques described herein. The processor 304 of the allocation server 408 may be configured to implement part or all of the features described herein, e.g., by executing program instructions stored on a memory medium (e.g., a non-transitory computer-readable memory medium). Alternatively (or in addition), the processor 304 may be configured as a programmable hardware element, such as an FPGA (Field Programmable Gate Array), or as an ASIC (Application Specific Integrated Circuit). Alternatively (or in addition) the processor 304, in conjunction with one or more of the other components 340, 350, 360, 370 may be configured to implement part or all of the features described herein.

Figure 4:
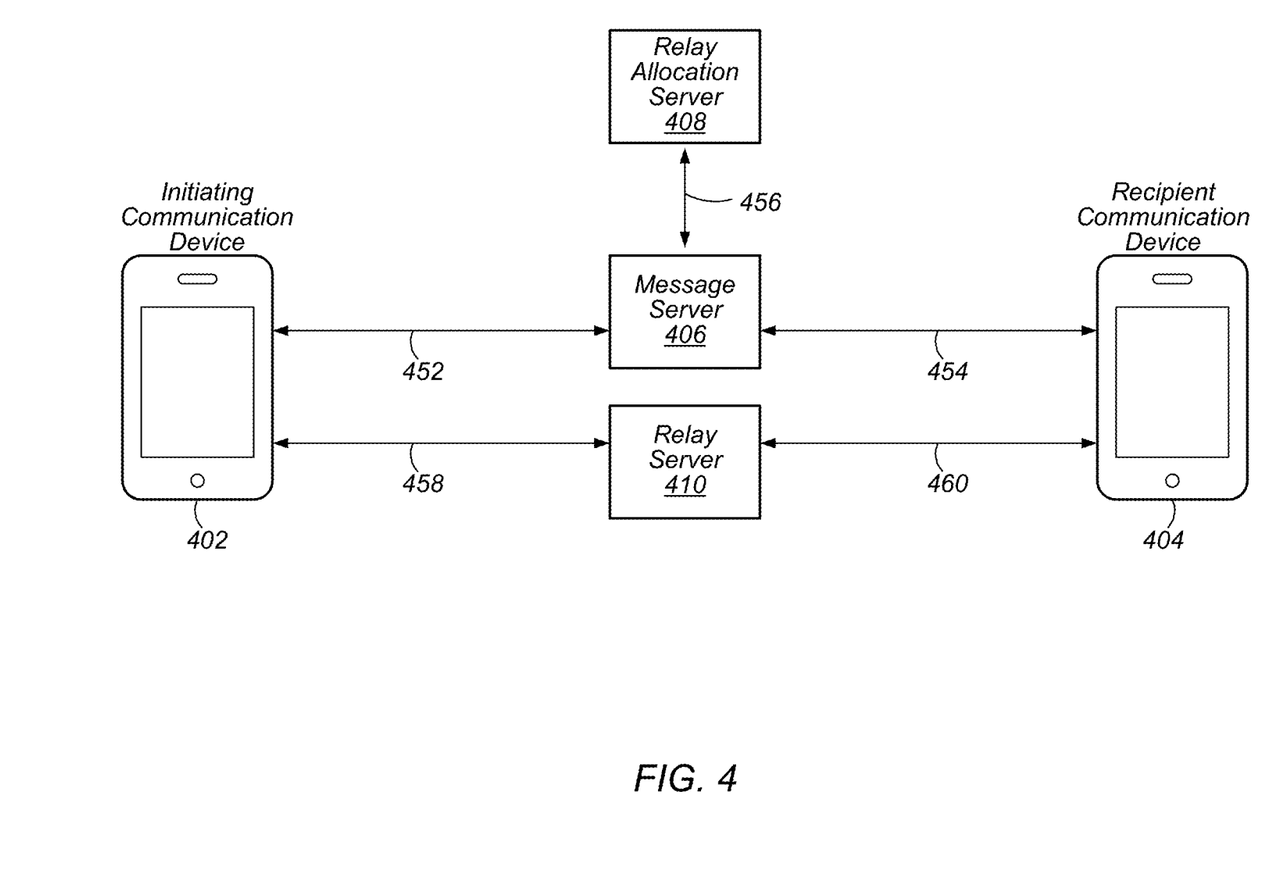
FIG. 4 illustrates an example communication system where a communication device communicates via a relay server allocated by a relay allocation server, according to some embodiments.

FIG. 4—Communication System

FIG. 4 illustrates an exemplary (and simplified) communication scenario involving establishment of a relayed communication session. It is noted that the system of FIG. 4 is one example of a possible system, and embodiments may be implemented in any of various systems, as desired.

As shown, the exemplary communication system includes an initiating communication device 402, a recipient communication device 404, a message server 406, a relay allocation server 408, and a relay server 410.

The initiating communication device 402 and the recipient communication device 404 may each be a communication device such as the communication device 106 of FIG. 1 and FIG. 2. The initiating communication device 402 may be configured to initiate a communication session with the recipient communication device 404. Such a communication session may include, e.g., a two-way streaming/live audio and/or video communication session. In some scenarios, one or both of the initiating communication device 402 and the recipient communication device 404 may be located behind a NAT, which may prevent the initiating communication device 402 and the recipient communication device 404 from communicating directly. Thus, the communication session may be established via the relay server 410.

The relay server 410 may be configured to relay communication data between communication devices. As shown, the relay server 410 may establish a connection 458 with the initiating communication device 402, and a connection 460 with the recipient communication device 404. In some scenarios, the connections 458 and 460 may be traditional IP connections. In other scenarios, other types of connections may be used. In some scenarios, the connections 458 and/or 460 may pass through a NAT (not shown) or other router, firewall, etc.

The relay server 410 may communicate signaling messages, such as bind requests and acknowledge messages via the connections 458 and 460 to establish a communication session between the initiating communication device 402 and the recipient communication device 404. Once the communication session has been established, the relay server 410 may receive communication data from either the initiating communication device 402 or the recipient communication device 404, and may forward the communication data to the other communication device.

In some scenarios, the relay server 410 may include a plurality of relay servers in communication with each other. For example, a first relay server may receive communication data from the initiating communication device 402 via the connection 458, and may forward the communication data to a second relay server. The second relay server may receive the communication data from the first relay server, and may forward the communication data to the recipient communication device 404 via the connection 460. Communication may be passed in the opposite direction in a similar manner.

The message server 406 may be configured to provide messaging between communication entities, such as between the initiating communication device 402 and the recipient communication device 404, or between one or more of those devices and the relay allocation server 408. As shown, the message server 406 may establish connection 452 with the initiating communication device 402, connection 454 with the recipient communication device 404, and connection 456 with the relay allocation server 408. In some scenarios, the connections 452 and/or 454 may pass through a NAT (not shown) or other router, firewall, etc.

In some scenarios, a connection established by the message server 406 with a communication entity, such as the connections 452, 454, and 456, may be a persistent connection. Specifically, a persistent connection is a communication connection that, once established, is not routinely torn down, e.g., due to lack of activity, but is instead maintained and/or reestablished over an extended period of time; e.g., whenever the communication entity has a network connection allowing communication with the message server 406. For example, in establishing a persistent connection, the message server 406 may perform discovery and/or handshaking with communication entity to establish the persistent connection, and may thereafter maintain the connection for an extended period of time; e.g., the message server 406 may maintain an open socket to the communication entity for the extended period of time. The message server 406 and/or the communication entity may, in some scenarios, periodically verify that the persistent connection remains open, e.g., in response to a period of inactivity. If the persistent connection is found to have terminated, then the message server 406 and the communication entity may reestablish the connection, e.g., immediately and/or without waiting to receive a request for further data communication via the persistent connection. For example, if the communication entity moves between communication networks, or changes from communicating via a first RAT to communicating via a second RAT, then the existing connection may terminate, but the message server 406 and the communication entity may (e.g., immediately) reestablish the persistent connection via the new network and/or the new RAT, such that the persistent connection remains available for communication. Utilizing persistent connections with the message server 406 may decrease delay in communications, as messages transmitted to, or via, the message server 406 may be transmitted via the open persistent connection, without performing additional discovery and/or handshaking.

In some scenarios, the message server 406 may utilize an address token, such as a push token, rather than an IP address, to address a communication entity to which it has a persistent connection. In some scenarios, an address token may uniquely identify a communication entity, such as a communication device 106. Thus, communication entities seeking to communicate with each other via the message server 408 may address communications to each other using their respective address tokens. For example, the initiating communication device 402 may transmit to the message server 408, via the connection 452, a communication addressed to the recipient communication device 404 using an address token of the recipient communication device 404, e.g., by including the address token in the communication. Upon receiving the communication, the message server 406 may determine that the included address token identifies the recipient communication device 404 and/or that the included address token is associated with the persistent connection 454. The message server may then forward the message to the recipient communication device 404. For example, the message server 406 may maintain a mapping of address tokens to associated communication entities, persistent connections associated with the communication entities, and/or current IP addresses of the associated communication entities. Specifically, because the message server 406 maintains a persistent connection with each communication entity, even while a communication entity moves between networks, changes RATs, or performs other actions that may change its IP address, the message server 406 may maintain knowledge of the current IP addresses of the communication entities. Thus, addressing a message to a receiving device via the message server 406 using an address token of the receiving device, rather than an IP address of the receiving device, may allow a transmitting device to transmit the message without first determining a global IP address of the receiving device. Similarly, the transmitting device may communicate with the message server 406 using its own address token, which may allow the transmitting device to communicate without first determining its own global IP address. This may further decrease delay in communications.

The relay allocation server 408 may be a relay allocation server such as the relay allocation server 408 of FIG. 3. The relay allocation server 408 may be configured to allocate the relay server 410 for the communication session, as discussed further below. The relay allocation server 408 may communicate with the message server 406 via the connection 456, which may be a persistent connection.

In some scenarios, where the connections 452 and 456 are both persistent connections, the initiating communication device 402 may be considered to have a persistent connection with the relay allocation server 408, even though the connection includes two legs via the message server 406. Similarly, the recipient communication device 404 may be considered to have a persistent connection with the relay allocation server 408. Similarly, the initiating communication device 402 may be considered to have a persistent connection with the recipient communication device 404. However, in some scenarios, the persistent connection between the initiating communication device 402 and the recipient communication device 404 via the messaging server may lack sufficient bandwidth or other resources to accommodate the relayed communication session. Thus, relayed communication session may be established via the relay server 410, while control signaling and/or other messaging may be conducted over the persistent connection via the message server 406.

Some communication scenarios may include additional recipient communication devices (not shown). For example, one or more second recipient communication devices may participate in a communication session with the initiating communication device 402 and the recipient communication device 404, e.g., in a group communication session. The one or more second recipient communication devices may each be configured in a manner similar to the recipient communication device 404. For example, each of the one or more second recipient communication devices may establish a connection with the message server 406, similar to the connection 454 (e.g., a persistent connection), and may further establish a connection with the relay server 410, similar to the connection 460. In such scenarios, the relay server 41 may receive communication data from any off the initiating communication device 402, the recipient communication device 404, or any of the one or more second recipient communication devices, and may forward the communication data to each of the other devices (or some subset thereof).

Figure 5:
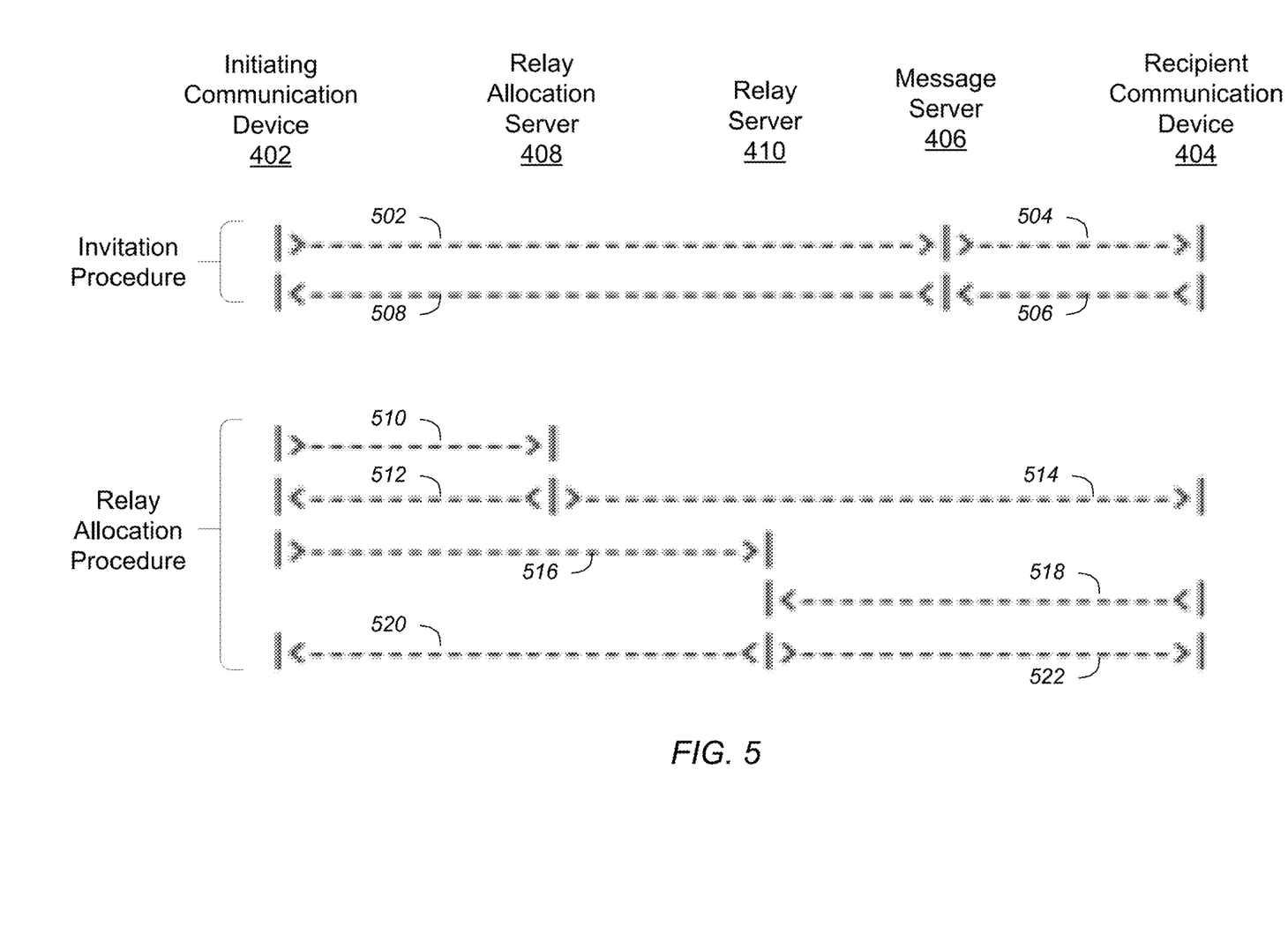
FIG. 5 illustrates an example flow diagram for establishment of a relayed communication session using a relay allocation server, according to some embodiments.

FIG. 5—Relayed Communication Establishment with a Relay Allocation Server

FIG. 5 illustrates an example flow diagram for establishment of a relayed communication session using a relay allocation server. FIG. 5 illustrates example behavior of the initiating communication device 402, a relay allocation server 408, a relay server 410, a message server 406, and at least one recipient communication device 404.

The initiating communication device 402 may initiate establishment of a communication channel with the recipient communication device by performing an invitation procedure and a relay allocation procedure, which may, in some scenarios, be performed in parallel.

The initiating communication device 402 may begin the invitation procedure by sending to a recipient communication device 404 an invitation to participate in the communication session. For example, the invitation may be sent via the message server 406. Specifically, the initiating communication device 402 may send to the message server 406 an invitation message 502 including the invitation, e.g., over the connection 452. The message server 406 may be configured to forward the invitation to the recipient communication device 404 by sending a forwarded invitation message 504 that includes the invitation, e.g., over the connection 454. Where more than one recipient communication device is to be invited, the initiating communication device 402 may in this manner send a respective invitation to each of the recipient communication devices, using one or more message servers. Alternatively, where more than one recipient communication device is to be invited, the initiating communication device 402 may send to the message server 406 a single invitation addressed to all of the recipient communication devices, and the message server 406 may forward the invitation to each of the recipient communication devices by sending a respective forwarded invitation message 504 that includes the invitation.

As previously noted, in some scenarios, the connections 452 and 454 may be persistent connections. In this way, the setup time of the communication session may be reduced by eliminating the time spent in establishing messaging connections for the messages 502 and 504 on demand. For example, the messages 502 and/or 504 may be sent via the message server 406. The message server 406 may be configured to maintain an open socket to each of various communication nodes (e.g., the initiating communication device and the recipient communication device 404), e.g., whenever the respective communication node has a network connection. In such scenarios, messages may be sent, e.g., as push notifications, and may be addressed using address tokens, such as push-tokens and/or push-topics.

For example, the invitation message 502 may be sent, e.g., as a push notification, including an address, e.g., an address token, of the recipient communication device 404. The message server 406 may be configured to receive the invitation message 502, and to forward the invitation to the recipient communication device 404 as the forwarded invitation message 504, based on the included address, e.g., address token, of the recipient communication device 404. In some scenarios, the invitation message 502 and the forwarded invitation message may not utilize and/or include IP addresses of the initiating communication device 402, the message server 406, and/or the recipient communication device 404.

In some scenarios, address tokens may be obtained, e.g., from a network identification system, prior to initiating establishment of the communication session. For example, address tokens of one or more recipient devices may be obtained opportunistically, and cached by the initiating communication device 402 at least until the communication session is established.

At least partly in response to receiving the invitation, e.g., at least partly in response to receiving the forwarded invitation message 504, the recipient communication device 404 may send an acceptance indicating that the recipient communication device 404 has accepted the invitation to participate in the communication session. Sending the acceptance may be further in response to receiving an input from a user accepting the invitation to participate in the communication session, such as an input from a user instructing the recipient communication device 404 to answer an incoming audio or video call. The acceptance may be sent via the message server 406. Specifically, the recipient communication device 404 may send to the message server 406 an acceptance message 506 including the acceptance, e.g., over the connection 454. The message server 406 may be configured to forward the acceptance to the initiating communication device 402 by sending a forwarded acceptance message 508 that includes the acceptance, e.g., over the connection 452. In various scenarios, the acceptance may be sent via the same message server 406 or via a different message server than the invitation.

In some scenarios, the messages 506 and 508 may not utilize and/or include IP addresses of the initiating communication device 402, the message server 406, and/or the recipient communication device 404.

The initiating communication device 402 may begin the relay allocation procedure by sending to the relay allocation server 408 a request 510 for allocation of a relay server for the communication session. For example, the request 510 may be sent over a persistent connection, e.g., including the connections 452 and 456. The connection may be authenticated, and may also be secure, e.g., using Transport Layer Security (TLS). The request 510 may be addressed to the relay allocation server, e.g., using an address token of the relay allocation server. The request may also include identification information, such as an address token, of the recipient communication device 404 (or of each of the recipient communication devices, where more than one recipient communication device is invited). In some scenarios, the request may not include an IP address of any of the initiating communication device 402, the recipient communication device 404, and the relay allocation server 408. The request may further include additional information, such as information identifying the communication session (e.g., a session token).

In response to receiving the request, the relay allocation server 408 may allocate a relay server 410 for the communication session. Specifically, the relay allocation server may allocate a single relay server 410 for use by both the initiating communication device and the recipient communication device 404 (and for all of the recipient communication devices, where more than one recipient communication device is invited). In selecting a relay server 410 for the communication session, the relay allocation server 408 may determine a relay server having a network location that is favorable (e.g., optimized) for communication with the initiating communication device 402. For example, a particular relay server 410 of a plurality of available relay servers may be favorable for communication with the initiating communication device if the path delay between the particular relay server 410 and the initiating communication device 402 is shorter than that of the other available relay servers. Thus, in some scenarios, the relay server 410 may be based on a network location of the initiating communication device 402, e.g., relative to the relay server 410.

Thus, in some scenarios, the relay server 410 may not be selected to be favorable (e.g., optimized) for communication with the one or more recipient communication devices. Specifically, the relay allocation server 408 may not consider optimization for the recipient communication devices when allocating the relay server. For example, the relay allocation server 408 may select the relay server 410 without regard to, or consideration of, a network location of the recipient communication device 404. This may result in reduced overall efficiency of the communication session relative to other methods in which a respective optimized relay server is selected for each communication device. However, by selecting only one relay server, the time spent in establishing the communication channel may be reduced, especially in scenarios involving multiple recipient communication devices. Specifically, no time may be spent in determining locations of the one or more recipient communication devices, and also no time may be spent in negotiating communication paths between multiple relay servers. Furthermore, according to the present disclosure, once the communication session has been established, a different relay server may be reallocated for a recipient device 404, as discussed below, to improve overall efficiency of the communication session.

Determining a relay server 410 having a network location that is favorable for communication with the initiating communication device 402 may be performed using knowledge of the relative network locations of available relay servers relative to the network location of the initiating communication device 402. Because network location may be determined based on IP address, the relay allocation server 408 may first determine the IP address of the initiating communication device 402. For example, the IP address and/or the address token of the initiating communication device 402 may be determined (e.g., inferred) using the received request 510.

Once a relay server 410 has been allocated for the communication session, the relay allocation server 408 may send to the initiating communication device 402 information identifying the allocated relay server 410, as illustrated by information message 512. The relay allocation server 408 may, e.g., send the information message 512 over the connection on which the request 510 was received. The information may include, e.g., an identifier, an address token, an IP address, and/or a communication port of the relay server 410 for use by the initiating communication device 402 in communicating with the relay server.

The relay allocation server may also send to the recipient communication device 404 (or to each of the recipient communication devices, if applicable) the information identifying the relay server 410, as illustrated by information message 514. For example, the information message 514 may be sent via the message server 406, e.g., over the connections 456 and 454.

Upon receiving the information identifying the allocated relay server, the initiating communication device 402 may send a relay bind request (i.e., a first relay bind request 516) to the relay server 410, e.g., over the connection 458. The first relay bind request 516 may be addressed using, or may otherwise include, at least a part of the information identifying the relay server 410, as included in the information message 512. For example, the first relay bind request 516 may include a STUN request addressed to the IP address and port of the relay server 410. The first relay bind request 516 may include information identifying the recipient communication device 404 (e.g., one or more address tokens) and/or the communication session. The first relay bind request 516 may thus request establishment of a relayed communication session with the recipient communication device 404 via the relay server 410. Thus, the system may continue to avoid determination and use of IP addresses of the recipient communication device 404. However, the relay server 410 may be able to determine (e.g., infer) the IP address of the initiating communication device 402 using the received first relay bind request 516.

Upon sending the first relay bind request 516, the initiating communication device 402 may initiate sending of data for the communication session. For example, the initiating communication device 402 may initiate sending of data intended for the recipient communication device 404 immediately after sending the first relay bind request 516, e.g., without awaiting a bind acknowledgment message or other response from the relay server 410. Thus, the sent data may arrive at the relay server 410 before binding has occurred for the recipient communication device 404. In some scenarios, the relay server 410 may merely drop any communication data received before binding has occurred for the recipient communication device 404. Alternatively, the relay server 410 may buffer some or all of the communication data received before binding has occurred for the recipient communication device 404. For example, the data may be buffered up to a certain size limit or time limit.

The recipient communication device 404 may also send a relay bind request (e.g., a second relay bind request 518) to the allocated relay server, e.g., over the connection 460, similar to the first relay bind request 516 sent by the initiating communication device 402. The second relay bind request 518 may include information identifying the initiating communication device 402 (e.g., an address token), other recipient communication devices, and/or the communication session. The second relay bind request 518 may thus request establishment of a relayed communication session with the initiating communication device 402 via the relay server 410. The second relay bind request 518 may be sent at least partly in response to the recipient communication device 404 receiving the information message 514. Sending of the second relay bind request 518 may be further in response to receiving the forwarded invitation message 504 and/or receiving an input from a user accepting the invitation to participate in the communication session, such as an input from a user instructing the recipient communication device 404 to answer an incoming audio or video call. The relay server 410 may be able to determine (e.g., infer) the IP address of the recipient communication device 404 using the received first relay bind request 516.

Upon sending the second relay bind request 518, the recipient communication device 404 may initiate sending of data for the communication session. For example, the recipient communication device 404 may initiate sending of data intended for the initiating communication device 402 immediately after sending the second relay bind request 518, e.g., without awaiting a bind acknowledgment message or other response from the relay server 410. Thus, the sent data may arrive at the relay server 410 before binding has occurred for one or more other participants of the communication session.

In response to receiving the first relay bind request 516, the relay server 410 may bind the relayed communication session (e.g., identified by a relay-session-id or relay-session-token) to the initiating communication device 402 (e.g., identified by a sender-ip or sender-port). Similarly, in response to receiving the second relay bind request 518, the relay server 410 may bind the relayed communication session to the recipient communication device 404. Once binding has occurred for both the initiating communication device 402 and the recipient communication device 402, the relay server 410 may begin to relay data sent by each device to the other.

In response to receiving the first and second relay bind requests, the relay server 410 may send a first bind acknowledgment message 520 to the initiating communication device 402 and a second bind acknowledgment message 522 to the recipient communication device 404. If binding was successful for both the initiating communication device 402 and the recipient communication device 404, then the acknowledgment messages 520 and 522 may include a success indication. However, if binding was unsuccessful for either device, then the acknowledgment messages 520 and 522 may include a failure indication. Alternatively, if binding was unsuccessful for either device, then the relay server 410 may indicate this by not sending the acknowledgment messages 520 and 522. In some scenarios, if binding is unsuccessful, the communication session may be terminated.

In some applications, data packets exchanged over the communication session may already be encrypted, so further encryption of the communication session may not be desired. Therefore, in some scenarios, either or both of the first and second relay bind requests may indicate that the communication session is to be established using User Datagram Protocol (UDP). However, some networks may filter out communications according to certain protocols, such as UDP, e.g., because they are deemed to be unsecure. For example, some relay servers may refuse to bind over UDP. Therefore, in some scenarios, e.g., if binding is unsuccessful according to UDP, the initiating communication device 402 and/or the recipient communication device 404 may send a new relay bind request indicating that the communication session is to be established using another protocol, such as Transmission Control Protocol (TCP) or TCP/TLS.

Relay Server Reallocation

Once the relayed communication session has been established, and data is being transferred, a new relay server may be reallocated for one or more of the participating communication devices. For example, the currently allocated relay server 410 may send a reallocate message to one or more of the participating communication devices, such as the recipient communication device 404, instructing the one or more participating communication devices to change to a different relay server (or to request that the relay allocation server 408 allocate a different relay server for the recipient communication device 404). In response to receiving the reallocate message, the one or more participating communications devices may each communicate with the relay allocation server 408, as discussed above, to request and receive allocation of a respective new relay server. Each of the new relay servers may then bind the communication session to the respective one or more participating communications devices allocated thereto. For each of the one or more of the participating communication devices, the first relay server 410 may receive notification, e.g., from the respective new relay server, that the communication session has been bound to the participating communications device by the respective new relay server. Subsequent to receiving the notification, the relay server 410 may transmit subsequent communication data for the communication session to each of the new relay servers, to be delivered to the one or more participating communication devices allocated thereto. Similarly, the first relay server 410 may receive data from one or more of the new relay servers for distribution to other participants in the communication session.

As one example, as discussed above, the communication session may be initially established with a single, first relay server 410 selected to be favorable for the initiating communication device 402, wherein this approach may avoid incurring delays associated with determining an IP address of the recipient communication device 404. However, once data is being transferred over the relayed communication session, the first relay server 410 may be able to determine (e.g., infer from the data packets) the IP address of the recipient communication device 404. Thus, the relay server 410 may be able to determine that another relay server may provide improved relay performance (e.g., more efficient service) for the recipient communication device 404, e.g., based on a network location of the recipient communication device 404, which may be determined based on the IP address.

In response to this determination that another relay server may provide improved relay performance for the recipient communication device 404, the first relay server 410 may send a reallocate message to the recipient communication device 404. Notably, the first relay server 410 may not, in some circumstances, send a reallocate message to the initiating mobile device 402. Thus, the recipient communication device 404 may be reallocated to a different relay server than the initiation communication device 402. The two relay servers may further communicate to reestablish the relayed communication session along a path between the two relay servers.

In other scenarios, reallocation may occur for other reasons. For example, the relay server 410 may send a reallocation message to one or more participating communication devices in response to a determination that the relay server 410 is overloaded. As another example, the relay server 410 may send a reallocation message to each of the participating communication devices as part of a shutdown sequence, e.g., to take the relay server 410 offline for maintenance. Thus, reallocation may improve overall robustness of the network.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a communication device or a relay allocation server may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for establishing a communication session between an initiating communication device and a recipient communication device using a relay allocation server, the method comprising:
    by the relay allocation server:
        receiving, from the initiating communication device, over a first connection, a request for allocation of a relay server for the communication session; and
        in response to receiving the request for allocation of a relay server for the communication session:
            allocating a first relay server for the communication session;
            providing, to the initiating communication device, over the first connection, information identifying the first relay server allocated for the communication session; and
            providing, to the recipient communication device, over a second connection, information identifying the first relay server allocated for the communication session.

2. The method of claim 1, wherein the allocating comprises the relay allocation server selecting the first relay server for use by both the initiating communication device and the recipient communication device to establish the communication session between the initiating communication device and the recipient communication device, wherein the first relay server is selected based on a network location of the initiating communication device and without regard to a network location of the recipient communication device.

3. The method of claim 1, further comprising:
by the relay allocation server:
receiving, from the recipient communication device, after providing to the recipient communication device the information identifying the first relay server, a request for allocation of a second relay server for use by the recipient communication device for the communication session;
allocating the second relay server for use by the recipient communication device for the communication session, the allocating based on a network location of the recipient communication device; and
providing, to the recipient communication device, information identifying the second relay server.

4. The method of claim 1, wherein the first connection and the second connection are persistent connections.

5. The method of claim 4, wherein the providing, to the recipient communication device, the information identifying the first relay server is performed without determining an IP address of the recipient communication device.

6. The method of claim 1, further comprising:
establishing a persistent connection between the relay allocation server and a messaging server;
wherein the first connection comprises a first connection leg comprising the persistent connection between the relay allocation server and the messaging server, and a second connection leg comprising a persistent connection between the messaging server and the initiating communication device;
wherein the second connection comprises the first connection leg comprising the persistent connection between the relay allocation server and the messaging server, and a third connection leg comprising a persistent connection between the messaging server and the recipient communication device.

7. The method of claim 1, wherein the recipient communication device is a first recipient communication device, wherein the communication session is further between the initiating communication device, the first recipient communication device, and a second recipient communication device, the method further comprising:
providing, to the second recipient communication device, over a third connection, information identifying the first relay server allocated for the communication session.

8. A recipient communication device comprising:
at least one processor; and
a memory storing software instructions executable by the at least one processor, the software instructions, when executed, causing the recipient communication device to:
receive, from a relay allocation server, information identifying a first relay server allocated for use by both the recipient communication device and an initiating communication device for a communication session initiated by the initiating communication device;
join the communication session using the first relay server;
receive, from the first relay server, after joining the communication session, an instruction to request a different relay server;
transmit, to the relay allocation server, a request for allocation of a second relay server for use by the recipient communication device for the communication session;
receive, from the allocation server, information identifying the second relay server allocated for use by the recipient communication device for the communication session; and
join the communication session using the second relay server.

9. The recipient communication device of claim 8, wherein the first relay server is selected without regard to a network location of the recipient communication device, and wherein the second relay server is selected based on the network location of the recipient communication device.

10. The recipient communication device of claim 8, wherein the software instructions cause the recipient communication device to:
establish a first persistent connection to a messaging server, wherein the messaging server maintains a second persistent connection with the relay allocation server, wherein receiving the information identifying the first relay server, transmitting the request for allocation of the second relay server, and receiving information identifying the second relay server are performed via the first persistent connection and the second persistent connection without additional connection establishment.

11. The recipient communication device of claim 8, wherein, in joining the communication session, the software instructions cause the recipient communication device to:
transmit, to the first relay server, a request to bind the recipient communication device to the communication session; and
receive, from the first relay server, an acknowledgment that both the recipient communication device and the initiating communication device are bound to the communication session.

12. The recipient communication device of claim 11, wherein, in joining the communication session, the software instructions further cause the communication device to:
transmit communication data to the first relay server after transmitting the request to bind the recipient communication device, but before receiving the acknowledgment.

13. An apparatus comprising:
at least one processor; and
a memory storing software instructions executable by the at least one processor to cause the apparatus to:
receive, from an initiating communication device, over a first connection, a request for allocation of a relay server for a communication session between an initiating communication device and a recipient communication device; and
in response to receiving the request for allocation of the relay server for the communication session:
allocate a first relay server for the communication session;
provide, to the initiating communication device, over the first connection, information identifying the first relay server allocated for the communication session; and
provide, to the recipient communication device, over a second connection, information identifying the first relay server allocated for the communication session.

14. The apparatus of claim 13, wherein, to allocate the first relay server for the communication session, the software instructions are executable to cause the apparatus to:
select the first relay server for use by both the initiating communication device and the recipient communication device to establish the communication session between the initiating communication device and the recipient communication device, wherein the first relay server is selected based on a network location of the initiating communication device and without regard to a network location of the recipient communication device.

15. The apparatus of claim 13, wherein the software instructions are executable to cause the apparatus to:
receive, from the recipient communication device, after providing to the recipient communication device the information identifying the first relay server, a request for allocation of a second relay server for use by the recipient communication device for the communication session;
allocate the second relay server for use by the recipient communication device for the communication session, the allocating based on a network location of the recipient communication device; and
provide, to the recipient communication device, information identifying the second relay server.

16. The apparatus of claim 13, wherein the first connection and the second connection are persistent connections.

17. The apparatus of claim 16, wherein providing, to the recipient communication device, the information identifying the first relay server is performed without determining an IP address of the recipient communication device.

18. The apparatus of claim 13, wherein the software instructions are executable to cause the apparatus to:
establish a persistent connection between the apparatus and a messaging server;
wherein the first connection comprises a first connection leg comprising the persistent connection between the apparatus and the messaging server, and a second connection leg comprising a persistent connection between the messaging server and the initiating communication device;
wherein the second connection comprises the first connection leg comprising the persistent connection between the apparatus and the messaging server, and a third connection leg comprising a persistent connection between the messaging server and the recipient communication device.

19. The apparatus of claim 13, wherein the recipient communication device is a first recipient communication device, wherein the communication session is further between the initiating communication device, the first recipient communication device, and a second recipient communication device, wherein the software instructions are executable to cause the apparatus to:
provide, to the second recipient communication device, over a third connection, information identifying the first relay server allocated for the communication session.

* * * * *